United States Patent [19]

Yoshizumi

[11] 4,373,013
[45] Feb. 8, 1983

[54] ELECTROCONDUCTIVE POWDER AND PROCESS FOR PRODUCTION THEREOF

[75] Inventor: Motohiko Yoshizumi, Urawa, Japan

[73] Assignee: Mitsubishi Kinzoku Kabushiki Kaisha, Tokyo, Japan

[21] Appl. No.: 186,555

[22] Filed: Sep. 12, 1980

[30] Foreign Application Priority Data

Sep. 14, 1979 [JP] Japan .................................. 54-117342
Feb. 13, 1980 [JP] Japan .................................. 55-16217
Jun. 23, 1980 [JP] Japan .................................. 55-84997

[51] Int. Cl.$^3$ ............................................. B22F 37/00
[52] U.S. Cl. ................................ 428/570; 252/520; 252/518; 428/403
[58] Field of Search ....................... 252/519, 518, 520; 428/403, 570, 404, 411, 913, 323, 328, 336; 106/1.05, 1.12, 286.1, 286.2, 286.4, 287.19; 75/951; 260/DIG. 21, DIG. 17; 427/216, 217

[56] References Cited

U.S. PATENT DOCUMENTS

| | | | |
|---|---|---|---|
| 2,853,398 | 9/1958 | Mackin et al. | 427/217 X |
| 2,853,401 | 9/1958 | Mackin et al. | 427/217 X |
| 2,853,403 | 9/1958 | Mackin et al. | 427/217 |
| 4,051,075 | 9/1977 | Johanssen et al. | 252/521 |
| 4,137,361 | 1/1979 | Dreffeyes et al. | 428/403 X |
| 4,150,905 | 4/1979 | Kaplan et al. | 428/403 |
| 4,275,703 | 6/1981 | Tsubusaki et al. | 428/403 |
| 4,291,089 | 9/1981 | Adamovic | 428/403 |

*Primary Examiner*—J. L. Barr
*Attorney, Agent, or Firm*—Wenderoth, Lind & Ponack

[57] ABSTRACT

By pouring a solution containing hydrolyzable tin and antimony salts into an aqueous dispersion of titanium oxide particles and mixing, the salts are caused to hydrolyze, whereby a uniform and strongly adherent coating layer of antimony-containing tin oxide is formed on the surface of each particle of the titanium oxide. The coated powder thus obtained is non-hygroscopic and non-toxic and exhibits stable electroconductivity. Furthermore, since it can possess excellent whiteness, it is suitable for forming the electroconductive layers of electro-thermosensitive papers and electrostatic recording papers, for use as the antistatic agent of resins, and for other uses.

6 Claims, 3 Drawing Figures

F I G. 3
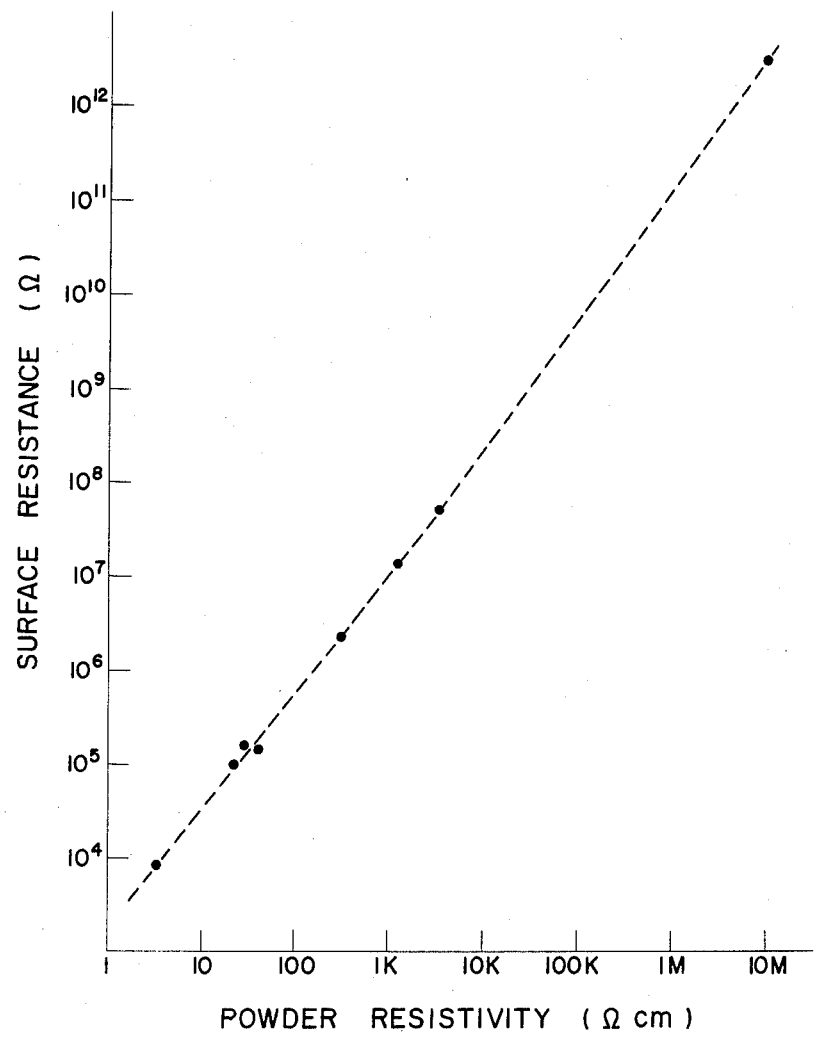

ELECTROCONDUCTIVE POWDER AND PROCESS FOR PRODUCTION THEREOF

FIELD OF THE INVENTION

This invention relates to a coated electroconductive powder suitable for use in applications such as forming electroconductive layers on paper for reproduction or duplication, such as electro-thermosensitive paper and electrostatic recording paper, and addition to resins to provide antistatic resins.

BACKGROUND OF THE INVENTION

The method of coating an electroconductive powder together with a binder on a substrate such as paper thereby to form thereon an electroconductive layer for the purpose of forming a paper for duplication such as an electrothermosensitive paper or an electrostatic recording paper is being widely practiced. The term "electro-thermosensitive paper" is herein used to designate a laminated composite sheet comprising a substrate layer, an electroconductive layer supported thereon, and a thermosensitive color-producing layer disposed on the electroconductive layer. The electroconductive layer is utilized as one electrode to cooperate with a recording head constituting another electrode in generating Joule heat by which a recording is made on the thermosensitive layer. An electroconductive powder to be used for such purposes is required to have, in addition to high and stable electroconductivity, characteristics such as a white color tone, uniformity of properties such as particle size and composition, excellent dispersibility, nontoxic nature, and low price.

However, copper iodide (CuI) powder, which is being widely used at present for the electroconductive layers of electro-thermosensitive papers, does not afford a perfectly white color tone although it does have good electroconductivity. Furthermore, because its production is unstable, it is difficult to produce this copper iodide powder in a uniform and stable manner. Still another problem arises from the toxicity of iodine.

In the case of an electrostatic recording paper, the electroconductivity of its electroconductive layer may be lower than that of an electro-thermosensitive paper. That is, it may have a high resistance. For this reason, organic electrolytes are being used for the electroconductive substance. However, because these electrolytes have the characteristic of adsorbing moisture in the air and in the substrate paper, this adsorbed moisture causes the resistance of the electroconductive layer to vary, making it difficult to secure stable electroconductivity. Zinc oxide (ZnO) whose resistance has been lowered by doping with aluminum is also being used, but it has poor resistance to humidity and lacks stability.

As additives to be added for imparting electroconductivity to resins or for lowering their tendency to be electrostatically charged, (a) powders of metals such as Ni, Cu, and Al, (b) Ag powder, and (c) carbon black, carbon fibers, etc., are known. However, oxide films are produced on the surfaces of powders (a), and their contact resistances increase; Ag powder (b) is expensive; and carbon materials (c) give black resins. Thus, none of these additives can be said to be fully satisfactory as a practical agent for imparting electroconductivity, especially, to a white resin.

SUMMARY OF THE INVENTION

It is an object of this invention to provide a coated electroconductive powder which has good and stable electroconductivity and, in accordance with necessity, is capable of imparting excellent white color tone, and which can be produced at a relatively low cost.

I have found from the results of my research that the foregoing object is achieved through the provision of the electroconductive powder of this invention which comprises titanium oxide particles and a coating layer of antimony-containing tin oxide applied on the surfaces of the titanium oxide particles.

It is known that antimony-containing tin oxide possesses electroconductivity. However, antimony-containing tin oxide powder by itself cannot be produced as a powder having uniform particle size and excellent dispersibility, and, moreover, it has the disadvantage of entailing high production cost. Still another difficulty is that, as the antimony content is increased, the color becomes bluish, and the degree of whiteness decreases.

In contrast, according to this invention, titanium oxide particles are used as nuclei, and their surfaces are coated with antimony-containing tin oxide. As are result, the good dispersibility and high degree of whiteness possessed by the titanium oxide particles are utilized, and, by the combination of these features and the surface electroconductivity of the antimony-containing tin oxide, the desired electroconductive composite powder is obtained. In the case of this invention, also, some lowering of the degree of whiteness, which occurs with an increase in the antimony content, cannot be avoided, but the extent of this lowering of the degree of whiteness is much less than that of antimony-containing tin oxide alone because of the excellent whiteness of the titanium oxide particles. Furthermore, titanium oxide particles have an excellent adhesiveness with respect to antimony-containing tin oxide which cannot be obtained with other white inorganic particles.

A second object of this invention is to provide an efficient process for producing the electroconductive powder mentioned above and more fully described hereinafter.

I have found that this object can be achieved by a process wherein an antimony salt and a tin salt are hydrolyzed in the presence of dispersed $TiO_2$. More specifically, the process of producing electroconductive powder according to this invention is characterized by the steps of mixing an aqueous dispersion of titanium oxide particles with a solution containing a hydrolyzable tin salt and a hydrolyzable antimony salt thereby to produce titanium oxide particles coated with antimony-containing tin oxide, and recovering the coated titanium oxide particles.

The nature, utility, and further features of this invention will be more clearly apparent from the following detailed description beginning with a consideration of general aspects of the invention and concluding with a number of specific examples of practice illustrating preferred embodiments thereof.

Throughout the following disclosure, quantities, including concentrations and proportions, are expressed in percent and parts by weight unless specified otherwise.

BRIEF DESCRIPTION OF THE DRAWINGS

In the drawings:

FIG. 3 is a graph indicating the relationship between powder resistivity of a coated powder and surface resistance of an electroconductive layer containing that coated powder.

DETAILED DESCRIPTION OF THE INVENTION

As mentioned hereinbefore, the coated electroconductive powder of this invention has a structure comprising titanium oxide particles as nuclei and a coating of antimony-containing tin oxide on the surfaces of the titanium oxide particles.

Titanium oxide ($TiO_2$) particles that are generally solid and have a specific surface area (BET method, $N_2$ adsorption) in the range of 1 to 20 meter$^2$/gram ($m^2/g$) (corresponding to an average particle size of 0.07 to 1.4 $\mu$m), particularly 1 to 10 $m^2/g$, are preferred. I have found that, when the specific surface area is less than 1 $m^2/g$, the $TiO_2$ particles become coarse, and, when they are used to form the electroconductive layer of a paper for reproduction, the smoothness of the paper surface is impaired, and that, when the specific surface area exceeds 20 $m^2/g$, the aggregation of the particles becomes extensive, and it becomes difficult to obtain a uniform aqueous dispersion in the production process described hereinafter.

The function of the $TiO_2$ particles is not merely to serve as inorganic particles of white color. The use of the $TiO_2$ particles is critical in the sense that they also serve as a substrate of high adhesiveness with respect to the antimony-containing tin oxide layer. $TiO_2$ particles of the rutile-type crystalline structure are particularly preferable over those of the anatase-type crystalline structure. At least one reason for this may be that the antimony-containing tin oxide also becomes stabilized with the rutile-type crystalline structure. Furthermore, titanium oxide particles, as $TiO_2$, of a purity of 98 percent or higher, particularly 99 percent or higher, are preferred, probably because of a relationship between this purity and retention of the crystalline structure. Since the coating layer thus obtained has excellent adhesiveness with respect to the substrate $TiO_2$, it will not peel off when the coated particles are subjected to ordinary powder treatments or to a process such as ball-milling.

The antimony (Sb)-containing tin oxide (typically, $SnO_2$) layer exists as a coating layer adhering intimately or strongly to the surfaces of the $TiO_2$ particles. This fact has been corroborated by surface analysis by electron spectroscopy for chemical analysis and also by observation by means of an electron microscope. That a uniform coating layer is formed in this manner means that the electroconductivity possessed by the Sb-containing tin oxide can be effectively utilized.

Figure 1:
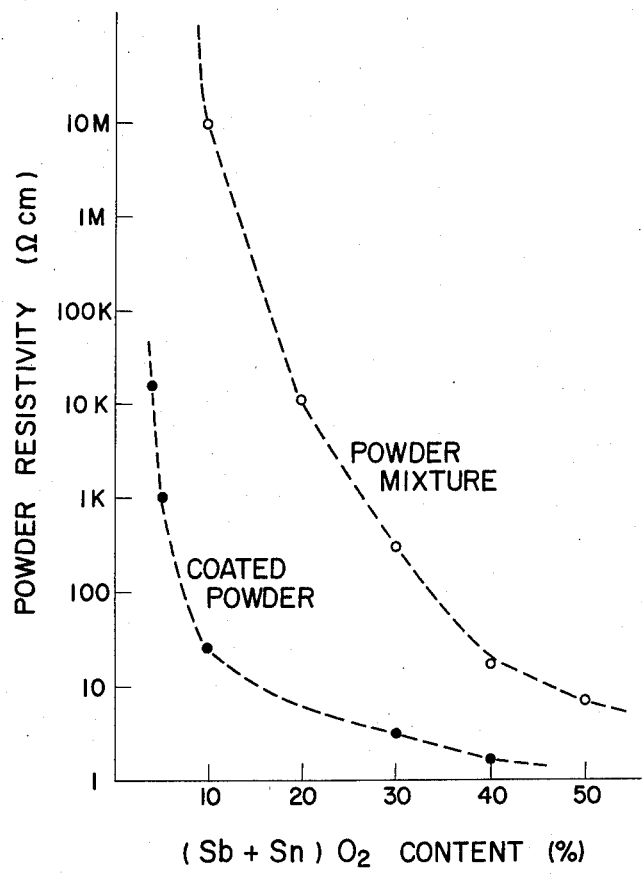
FIG. 1 is a graph indicating the relationship between the content of antimony-containing tin oxide and powder resistivity respectively of titanium oxide particles coated with antimony-containing tin oxide, and of a mixture of powders of antimony-containing tin oxide and titanium oxide.

In this connection, FIG. 1 is a graph in which powder resistivity values are plotted against variation in the quantity of Sb-containing tin oxide with respect to two kinds of powders. One kind of powder is a coated powder comprising particles of $TiO_2$ of a specific surface area of approximately 6 $m^2/g$ on which 9.3-percent Sb-containing tin oxide has been formed as coating layers of various thicknesses. The other is a powder mixture of the same $TiO_2$ particles and particles (specific surface area of 30 $m^2/g$) of the same Sb-containing tin oxide. As is apparent from this graph, a much lower powder resistivity can be obtained with the coated powder than with the powder mixture for the same quantity of Sb-containing tin oxide. The powder resistivities appearing throughout the disclosure were measured for the powders while being compressed under a pressure of 150 $kg/cm^2G$.

As the quantity of the Sb-containing tin oxide in the coated powder increases, the powder resistivity, in general, decreases. However, an even better interrelation with the powder resistivity is obtained by the thickness of the coating layer rather than the quantity of the Sb-containing $SnO_2$ itself. Here, the thickness of the coating layer is determined in the following manner.

In the case where the contents of Ti, Sn, and Sb are obtained from an elemental analysis of the coated powder (also, it has been confirmed that, in the case of the production process described hereinafter, the correspondence between the contents of the respective elements and the ratio of starting material quantities is also good), calculation is carried out with the assumption that these metals all exist in the forms of $TiO_2$, $SnO_2$, and $SbO_2$, and the proportion of the coating layer expressed as x percent is obtained by dividing the sum $SnO_2 + SbO_2$ by the total of $SnO_2 + SbO_2 + TiO_2$. When the density of the coating layer is assumed to be substantially constant at 6.9 $g/cm^3$, and the specific surface area of the $TiO_2$ particles used is denoted by A ($m^2/g$), the thickness t ($\mu$m) of the coating layer is given by the following equation.

$$t\ (\mu m) = \frac{x/100/6.9}{A(1 - x/100)}$$

In general, coating layers of thicknesses in the range of 0.001 to 0.07 $\mu$m as calculated in this manner are used. I have found that with a thickness less than 0.001 $\mu$m, the intended improvement of the electroconductivity cannot be obtained. With a thickness exceeding 0.07 $\mu$m, the rate of improvement in electroconductivity with increase in thickness is not very much; rather, a phenomenon of peeling of the coating layer tends to occur. Preferred narrower ranges of this thickness for specific applications vary, of course, since there are numerous uses for electroconductive powder. For example, in cases where electroconductivity is important, as in the use of the powder for forming an electroconductive layer for an electro-thermosensitive paper or in blending with resins, the thickness range of 0.007 to 0.07 $\mu$m is more preferable, whereas in the case where the requirement for electroconductivity is of relatively less importance, as in the forming of an electrostatic recording layer, the thickness range of 0.001 to 0.04 $\mu$m is preferable.

The Sb content in the coating layer, in general, is preferably 0.1 percent or more in order to obtain the intended improvement in electroconductivity. Furthermore, in the case where a white coating layer is desired, an Sb content of 30 percent or less is preferred. While the Sb can be considered to exist as a mixture of oxides such as $Sb_2O_3$ and $Sb_2O_5$ in the coating layer, it is here assumed that the Sb content can be calculated from the formula $Sb/(SbO_2 + SnO_2)$.

Figure 2:
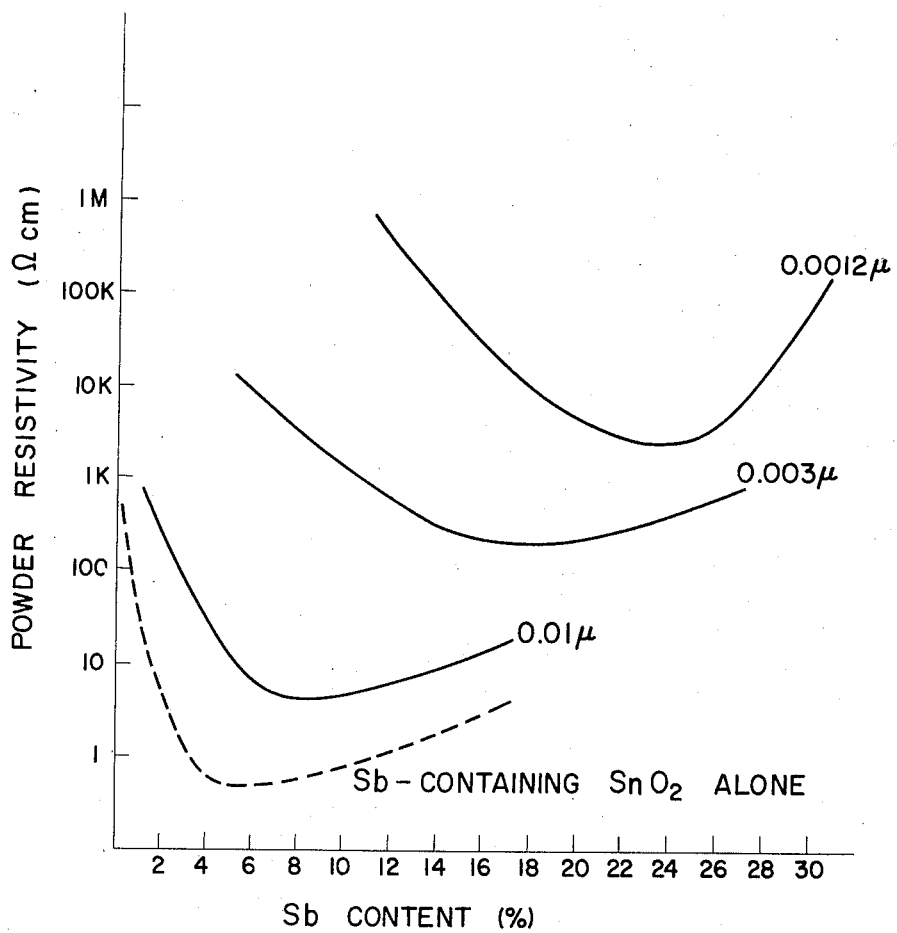
FIG. 2 is a graph indicating the relationship between the antimony content in a coating and resistivity of coated powder for coatings of different thicknesses.

The effect of the Sb content in the coating layer on the powder resistivity differs with the thickness of the coating layer. For example, FIG. 2 is a graph indicating the interrelation between Sb content in the coating layer and powder resistivity when coating layers of different thicknesses are formed on $TiO_2$ particles having a specific surface area of 6 $m^2/g$. This graph indicates that, as the coating thickness is reduced, the Sb content corresponding to minimum powder resistivity increases. In general, as the Sb content increases, the coating layer tends to turn bluish. For this reason, it can be said that the optimum Sb content with respect to each coating layer thickness is that resulting in the minimum value of the resistivity or a value somewhat on the lower side of the minimum value. From the standpoint of obtaining whiteness and high electroconductivity, the Sb content in the coating layer is in the range of preferably 0.1 to 20 percent, most preferably 1 to 15 percent.

The process according to this invention, which is a preferred process of producing the above described electroconductive powder of this invention, will now be described with respect to its preferred mode.

According to this invention, first, an aqueous dispersion of the $TiO_2$ is obtained. While the concentration of the $TiO_2$ in this dispersion is not especially limited provided that a uniform dispersion can be obtained, it is preferably in the range of 10 to 500 g/l.

Separately, a solution containing a hydrolyzable Sn salt and a hydrolyzable Sb salt is prepared. For these Sn and Sb salts, chlorides are preferably used for ease in handling, and low price, but, in addition, their other halides, sulfates, nitrates, oxalates, and acetates are also useable.

For the solvent of the above mentioned solution, any solvent which dissolves the above enumerated salts and, at the same time, suppresses hydrolysis thereof can be used. For example, solvents such as lower alcohols having 1 to 5 carbon atoms, ketones such as acetone and methylethyl ketone, and aqueous solutions of acids containing counter ions of the above mentioned salts, for example, hydrochloric acid, in a concentration (for example, 73 g/l or higher in the case of hydrochloric acid) sufficient to suppress hydrolysis of the above mentioned salt can be used. Of these solvents, ethanol, methanol, and an aqueous solution of hydrochloric acid are most preferable because of their low prices and facility in handling.

The concentration of the salt in the solution, in the case of a chloride, as a particular example, tin tetrachloride ($SnCl_4$), is preferably in the range of 78 to 783 g/l. I have found that, when this concentration is less than the lower limit, the $SnO_2$ content is totally insufficient, which gives rise to a lowering of the rate of deposition of $SnO_2$ on the surfaces of the $TiO_2$ particles, a lengthening of the processing time, and a lowering of the process efficiency. On the other hand, when the upper limit of this concentration is exceeded, the deposition of the $SnO_2$ on the $TiO_2$ particles becomes nonuniform, and it becomes difficult to form a coating layer of uniform thickness.

The concentration of the antimony chloride ($SbCl_3$), as a result of its relation to the $SnO_2$ concentration, is so set that the above mentioned range of concentration of the Sb in the coating layer is obtained. From this standpoint, a preferable $SbCl_3$ concentration is 0.085 to 410 g/l, particularly 0.854 to 150 g/l.

It is also possible, depending on the necessity, to use a tin chloride other than $SnCl_4$ and an antimony chloride other than $SbCl_3$ since they are also hydrolyzable. The quantities in which these other chlorides are used are so determined that their metal concentrations will conform to the above described standard.

The solution containing the hydrolyzable salts obtained in the above described manner and the aforedescribed $TiO_2$ dispersion are then mixed, and the salts are hydrolyzed thereby to form a coating layer of Sb-containing $SnO_2$ on the $TiO_2$ particles. During this step, in order to obtain a uniform coating layer, it is preferable to feed the solution containing the hydrolyzable salts into the $TiO_2$ dispersion as this dispersion is agitated. It is also preferable during this step to keep the $TiO_2$ dispersion heated at a temperature of, for example, 60° to 100° C. in order to promote the hydrolysis and also to result in a coating layer with a strong adhesiveness.

According to my experience, since substantially the entire quantity of the hydrolyzable Sn salt and Sb salt contained in the added solution is hydrolyzed to produce the Sb-containing $SnO_2$ layer, the thickness of the coating layer can be controlled by controlling the addition quantity or concentration of the solution. Furthermore, in order to promote the hydrolysis, it is also possible to add an alkaline substance such as, for example, caustic soda, caustic potassium, or ammonia, into the hydrolysis bath in a quantity within a range for maintaining the acidity thereof.

In the process of this invention, it is necessary that the Sn salt and the Sb salt hydrolyze simultaneously in the presence of dispersed particles of $TiO_2$. Accordingly, it is preferable to make both the Sn salt and the Sb salt into a common solution and to add this into the $TiO_2$ dispersion, but it is also possible to prepare an Sn salt solution and an Sb salt solution separately and to add these solutions simultaneously into the dispersion. In this case, the solution containing both the Sn salt and the Sb salt to be mixed with the dispersion is formed in situ in the hydrolysis system.

The coated particles obtained in this manner are next separated out by a commonly used solid-liquid separation measure such as precipitation or filtration and, according to necessity, are subjected to treatment such as washing with water, drying, and crystal growing by heating, thereby yielding the coated electroconductive particles of the invention. The powder resistivity of the electroconductive powder can be adjusted within a range of 1 $\Omega$cm to 1 M$\Omega$cm by controlling the coating layer thickness or/and the Sb content within the coating layer.

As mentioned hereinbefore, the electroconductive powder of this invention can be used for forming electroconductive layers of reproducing paper such as electro-thermosensitive paper and electrostatic recording paper by applying this powder together with a binder as a coating on a substrate sheet material, and for imparting antistatic properties by blending the powder with a resin or coating the powder on a resin film. In addition, this powder is useable for almost all applications wherein electroconductive powders are used, such as powder for electrodes and electroconductive glaze for ceramics. This electroconductive powder is particularly useful where it can fully exhibit its advantageous characteristics as an electroconductive powder having excellent whiteness, nonhygroscopicity, nontoxicity, and stability.

FIG. 3 is a graph wherein the surface resistances of electroconductive layers are plotted against powder resistivity. These electroconductive layers were formed by coating, in each layer, 75 parts of an electroconductive powder together with 25 parts of a respective binder on plain paper of a thickness of 10μ (dry). The electroconductive powder, wherein the specific surface area of the $TiO_2$ was 6 $m^2$/g, had, for respective electroconductive layers, various powder resistivities obtained by varying the coating layer thickness or the Sb content in the coating layer. The binder was a vinyl chloride/vinyl acetate copolymer. The above mentioned surface resistance of each electroconductive layer is the resistance between a pair of electrodes, each of 1-cm length, spaced 1 cm apart and placed in contact with the surface of the electroconductive layer so as to define a square of 1 $cm^2$ area therebetween, this resistance being expressed in terms of $\Omega/\square$. As is apparent from this graph, surface resistances of $10^4$ to $10^5$ $\Omega/\square$ required for electro-thermosensitive papers and surface resistances of $10^7$ to $10^{10}$ $\Omega/\square$ required for electrostatic recording papers are fully covered.

The foregoing disclosure is concerned principally with a white electroconductive powder and the process of producing the same. However, the electroconductive powder of this invention can be rendered into a colored electroconductive powder by coloring it after production thereof with a dye or a pigment or by adding a dye or a pigment into the above described hydrolysis bath, as will be apparent to those skilled in the art. Furthermore, it is also possible, of course, to admix the electroconductive powder together with a coloring agent into a composition with which the electroconductive powder is to be blended.

In order to indicate more fully the nature and utility of this invention, the following examples of practice thereof are set forth, it being understood that these examples are presented as illustrative only, and that they are not intended to limit the scope of the invention.

EXAMPLE 1

30 Grams (g) of a $TiO_2$ powder having a specific surface area of 5 $m^2$/g was added to 800 cc of water. The resulting mixture was heated to and held at a temperature of 90° C., at which it was agitated thereby to prepare a heated suspension in which the above described $TiO_2$ powder was uniformly dispersed. Into this heated suspension, a solution obtained by dissolving 75 g of $SnCl_4$ and 2.46 g of $SbCl_3$ in 200 cc of ethanol was slowly fed over a period of 2 hours thereby to deposit and form a coating layer comprising Sb-containing $SnO_2$ on the surfaces of the $TiO_2$ particles. The coated particles thus obtained were separated by filtration and washed. Then, in order to further improve the crystallinity of the coating layer, the particles were held in air at a temperature of 500° C. for 2 hours thereby to produce a coated powder of this invention.

This coated powder on each particle thereof, had a coating layer of white color comprising 2.9 percent of Sb and a remainder essentially of $SnO_2$ and having a uniform layer thickness of 0.042 μm, and was a powder of good electroconductivity having a resistivity of 10 $\Omega$cm.

EXAMPLE 2

100 g of a $TiO_2$ powder having a specific surface area of 3 $m^2$/g was added to 1,000 cc of water. The resulting mixture was heated to and held at a temperature of 90° C., at which it was agitated thereby to prepare a heated suspension in which the above described $TiO_2$ powder was uniformly dispersed. Into this heated suspension, a solution obtained by dissolving 25 g of $SnCl_4$ and 3.28 g of $SbCl_3$ in 75 cc of ethanol was slowly dropped over 1 hour. Thereafter, by the same procedure and under the same conditions as in Example 1, a coated powder of this invention was produced.

The coated powder was found to be a powder of good electroconductivity having, on each particle thereof, a white coating layer comprising 10.3 percent of Sb and a remainder essentially of $SnO_2$ and having a uniform layer thickness of 0.007 μm. Moreover, this coated powder had good electroconductivity and a resistivity of 380 $\Omega$cm.

EXAMPLE 3

10 g of a $TiO_2$ powder having a specific surface area of 3 $m^2$/g was added to 200 cc of water. The resulting mixture was heated to and held at a temperature of 90° C., at which it was agitated thereby to prepare a heated suspension. Two other lots of the same heated suspension were prepared in the same manner. Separately, three different solutions were prepared by dissolving lots of 0.41 g, 0.82 g, and 1.64 g of $SbCl_3$, respectively, together with 25 g of $SnCl_4$ in respective 75 cc of ethanol. Each of these solutions was slowly fed over 1 hour into a respectively separate lot of the above described heated suspension thereby to cause the ethanol to evaporate and cause hydrolysis and thereby to cause a coating layer comprising Sb-containing $SnO_2$ to be deposited and formed on the surfaces of the particles of the $TiO_2$ powder. Thereafter, under the conditions and by the procedure of Example 1, three kinds of coated powders of this invention were obtained.

These three coated powders were found to have white coating layers respectively comprising 1.5 percent, 2.9 percent, and 5.7 percent of Sb and a remainder essentially of $SnO_2$ and all having a uniform layer thickness of 0.069 μm. These coated powders were found to have good electroconductivity, having resistivities respectively of 120 $\Omega$cm, 6 $\Omega$cm, and 2 $\Omega$cm.

EXAMPLE 4

1,000 g of a $TiO_2$ powder having a specific surface area of 5 $m^2$/g was added to 7,000 cc of water, and the resulting mixture was heated to and held at 90° C. Then, as this heated mixture was agitated, a solution prepared by dissolving 150 g of $SnCl_4$ and 20 g of $SbCl_3$ in 500 cc of ethanol was slowly fed thereinto over 2 hours thereby to cause a coating layer comprising Sb-containing $SnO_2$ to be deposited on the surfaces of the particles of the $TiO_2$ powder. The coated powder thus obtained was then separated by filtration, washed, and then subjected to a heat treatment by holding it in air at a temperature of 500° C. for 2 hours for the purpose of improving the crystallinity. Thus, a coated powder of this invention was produced.

This coated powder was found to have a white coating layer having a composition comprising 10 percent of Sb and a remainder essentially of $SnO_2$ and having a uniform layer thickness of 0.003 μm. Moreover, this powder had a resistivity of 1.5 K$\Omega$cm.

EXAMPLE 5

1,000 g of a $TiO_2$ powder having a specific surface area of 7 $m^2$/g was added to 7,000 cc of water. The resulting mixture was heated to and held at a temperature of 90° C., at which, as the mixture was agitated, a solution prepared by dissolving 250 g of $SnCl_4$ and 17 g of $SbCl_3$ in 1,000 cc of methanol was slowly dropped thereinto over 3 hours. Thereafter, by the procedure and under the conditions of Example 4, a coated powder of this invention was produced.

The coated powder was found to have a white coating layer comprising 6 percent of Sb and a remainder essentially of $SnO_2$ and having a uniform layer thickness of 0.003 μm and, moreover, to have a resistivity of 2 KΩcm.

EXAMPLE 6

A coated powder of this invention was produced under the conditions specified in Example 4 except for the use of a solution for feeding into the $TiO_2$/water mixture which was prepared by dissolving 100 g of $SnCl_4$ and 17 g of $SbCl_3$ in 400 cc if an aqueous 6 N hydrochloric acid solution.

The coated powder of the invention thus produced was found to have a resistivity of 10 KΩcm and, moreover, to have a white coating layer having a composition comprising 13 percent of Sb and a remainder of $SnO_2$ and having a uniform layer thickness of 0.002 μm.

EXAMPLE 7

A coated powder of this invention was produced under the conditions set forth in Example 4 except for the use of a solution prepared by dissolving 75 g of $SnCl_4$ and 12.5 g of $SbCl_3$ in 400 cc of acetone as the solution for feeding into the $TiO_2$/water mixture.

This coated powder was found to have a resistivity of 100 KΩcm and, moreover, to have a white coating layer comprising 13 percent of Sb and a remainder of $SnO_2$ and having a layer thickness of 0.0015 μm.

EXAMPLE 8

100 g of a $TiO_2$ powder having a specific surface area of 5 $m^2/g$ was added to 1,000 cc of water. The resulting mixture was heated to and held at a temperature of 90° C. and agitated and was thus held in a state of a suspension in which the $TiO_2$ powder was uniformly dispersed. Into this heated suspension, a solution prepared by dissolving 86.5 g of $SnCl_4$ and 4.93 g of $SbCl_3$ in 300 cc of methanol was slowly fed over 2 hours thereby to cause a coating layer of Sb-containing $SnO_2$ to be deposited and formed on the surfaces of the particles of the $TiO_2$ powder. The $TiO_2$ powder thus coated was then separated by filtration, washed, and further held in air at a temperature of 500° C. for 2 hours in order to improve the crystallinity thereof. Thus a coated powder of this invention was produced.

This coated powder was found to have a white coating layer comprising 5 percent of Sb and a remainder essentially of $SnO_2$ and constituting a proportion of 33 percent of the entire powder, and to be a good electroconductive powder having a resistivity of 30 Ωcm.

EXAMPLE 9

100 g of a $TiO_2$ powder having a specific surface area of 3 $m^2/g$ was added to 1,000 cc of water, and the resulting mixture was heated to and held at a temperature of 90° C., at which it was agitated thereby to prepare a heated suspension in which the $TiO_2$ powder was uniformly dispersed. As this heated suspension was maintained in this state, a solution prepared by dissolving 34.6 g of $SnCl_4$ and 4.17 g of $SbCl_3$ in 200 cc of isopropyl alcohol was slowly added thereto over 1.5 hours. Thereafter, by the procedure and under the conditions set forth in Example 8, a composite powder of this invention was produced.

This composite powder was found to have a white coating layer comprising 10 percent of Sb and a remainder essentially of $SnO_2$ and being in a proportion of 17 percent of the entire powder and, moreover, to be a powder of high electroconductivity having a resistivity of 150 Ωcm.

EXAMPLE 10

100 g of a $TiO_2$ powder having a specific surface area of 3 $m^2/g$ was added to 1,000 cc of water. The resulting mixture was heated to and held at 95° C. while it was agitated thereby to prepare a heated suspension. Two other lots of the same heated suspension were prepared in the same manner. Separately, three solutions were prepared by dissolving 1.19 g, 2.41 g, and 4.94 g, respectively, of $SbCl_3$ together with 86.5 g of $SnCl_4$, each, in 300 cc of butyl alcohol, each. Each of these three solutions was separately fed slowly into a respective lot of the above described heated suspension over 2 hours thereby to cause evaporation of the butyl alcohol and hydrolysis and thereby to cause a coating layer comprising Sb-containing $SnO_2$ to be deposited and formed on the surfaces of the particles of the above mentioned $TiO_2$ powder. Thereafter, three composite powders of this invention were produced from the resulting powders under the conditions and by the procedure specified in Example 8.

The particles of these composite powders were found to have white coating layers respectively comprising 1.25 percent, 2.5 percent, and 5 percent of Sb and remainders each essentially of $SnO_2$ and, moreover, each constituting a proportion of 33 percent of the entire powder. These composite powders were further found to have good electroconductivity, having resistivities of 360 Ωcm, 20 Ωcm, and 6 Ωcm.

EXAMPLE 11

1,000 g of a $TiO_2$ powder having a specific surface area of 7 $m^2/g$ was added to 7,000 cc of water. The resulting mixture was heated to and held at a temperature of 90° C., and into this mixture, as it was agitated, a solution prepared by dissolving 75 g of $SnCl_4$ and 30 g of $SbCl_3$ in 400 cc of acetone was slowly poured over 2 hours thereby to cause a coating layer comprising Sb-containing $SnO_2$ to be deposited on the surfaces of the particles of the above mentioned $TiO_2$ powder. The coated powder thus obtained was separated by filtration, washed, and further subjected to a heat treatment comprising holding the powder in air at a temperature of 500° C. for 2 hours for the purpose of improving the crystallinity of the powder, whereby a coated powder of the invention was produced.

This powder was found to have a coating layer comprising 25 percent of Sb and a remainder essentially of $SnO_2$ and having a uniform thickness of 0.0013 μm and, moreover, to have a resistivity of 1.0 KΩcm.

I claim:

1. Electroconductive powder consisting essentially of titanium oxide particles and a coating layer of a mixture of antimony oxide and tin oxide provided on the surfaces of the titanium oxide particles, wherein said titanium oxide particles have a rutile crystalline structure, a purity of at least 98 percent, and a specific surface area of 1 to 20 $meter^2/gram$, and said coating layer has a thickness of 0.001 to 0.07 μm and contains 0.1 to 30 percent by weight of antimony.

2. Electroconductive powder according to claim 1 in which the titanium oxide particles have a specific surface area of 1 to 10 meter²/gram.

3. Electroconductive powder according to claim 1 in which the thickness of the coating layer is 0.007 to 0.07 μm.

4. Electroconductive powder according to claim 1 in which the thickness of the coating layer is 0.001 to 0.04 μm.

5. Electroconductive powder according to claim 1 in which the coating layer contains 0.1 to 20 percent by weight of antimony.

6. Electroconductive powder according to claim 1 in which the coating layer contains 1 to 15 percent by weight of antimony.

* * * * *